US 10,044,580 B2

(12) United States Patent
Kiessling et al.

(10) Patent No.: US 10,044,580 B2
(45) Date of Patent: Aug. 7, 2018

(54) REDUNDANTLY OPERABLE INDUSTRIAL COMMUNICATION SYSTEM, COMMUNICATION DEVICE AND METHOD FOR REDUNDANTLY OPERATING AN INDUSTRIAL COMMUNICATION SYSTEM

(71) Applicants: Marcel Kiessling, Cadolzburg (DE);
Joachim Lohmeyer, Hilpoltstein (DE)

(72) Inventors: Marcel Kiessling, Cadolzburg (DE);
Joachim Lohmeyer, Hilpoltstein (DE)

(73) Assignee: Siemens Aktiengesellschaft, Munich (DE)

( * ) Notice: Subject to any disclaimer, the term of this patent is extended or adjusted under 35 U.S.C. 154(b) by 308 days.

(21) Appl. No.: 14/035,546

(22) Filed: Sep. 24, 2013

(65) Prior Publication Data

US 2014/0095704 A1   Apr. 3, 2014

(30) Foreign Application Priority Data

Sep. 28, 2012   (EP) .................................. 12186557

(51) Int. Cl.
*G06F 15/173* (2006.01)
*H04L 12/26* (2006.01)
(Continued)

(52) U.S. Cl.
CPC ........ *H04L 43/08* (2013.01); *G05B 19/41855* (2013.01); *H04L 12/40169* (2013.01); *H04L 67/12* (2013.01); *H04L 43/10* (2013.01)

(58) Field of Classification Search
CPC ..... H04L 43/00; H04L 12/2602; H04L 41/22; H04L 43/08; H04L 12/40169; G06F 11/00
(Continued)

(56) References Cited

U.S. PATENT DOCUMENTS 7,656,790 B2 *  2/2010  Wakumoto .......... H04L 41/0663
                                                          370/221
8,036,106 B1 * 10/2011  Hu ....................... H04L 41/0213
                                                          370/218
(Continued)

FOREIGN PATENT DOCUMENTS

DE       102009048046 A1    4/2010
EP          1575221 A1      9/2005
(Continued)

OTHER PUBLICATIONS

Author: Michael Jager, Oliver Miggemann, Roman Just, Title: Using Automatic topology discovery to diagnose profinet networks, Date Published: 2011, Publisher: inIT—Institut Industrial IT Hochschule Ostwestfalen-Lippe, University of Applied Science Lemgo, Germany, Edition: ETFA 2011, IEEE Conference, pp. 4.*

*Primary Examiner* — Larry Donaghue
*Assistant Examiner* — Binod J Kunwar
(74) *Attorney, Agent, or Firm* — Cozen O'Connor (57) ABSTRACT

A redundantly operable industrial communication system having a plurality of communication devices redundantly linked to an industrial communication network within a ring or tree topology, and a plurality of communication devices inter connected within a linear topology, wherein a communication device configured as a ring portion redundancy manager within the linear topology comprises a monitoring and control unit that detects an interruption within the linear topology using transmitted test messages and controls forwarding of messages containing useful data between two ports, associated with the linear topology, of the communication device configured as a ring portion redundancy manager when an interruption is detected, and first and second communication devices return test messages received within the linear topology to the communication device configured (Continued)

as a ring portion redundancy manager or send test messages to the communication device configured as the ring portion redundancy manager.

18 Claims, 4 Drawing Sheets

(51) Int. Cl.
  *H04L 29/08* (2006.01)
  *G05B 19/418* (2006.01)
  *H04L 12/40* (2006.01)
(58) Field of Classification Search
  USPC .............................. 709/224; 370/242, 222
  See application file for complete search history.

(56) References Cited

U.S. PATENT DOCUMENTS

| | | | | |
|---|---|---|---|---|
| 8,184,527 | B2* | 5/2012 | Ling | H04L 12/40169 370/216 |
| 8,344,736 | B2* | 1/2013 | Wimmer | H04L 1/22 324/555 |
| 8,355,348 | B1* | 1/2013 | Miller | H04L 12/462 370/256 |
| 8,520,507 | B1* | 8/2013 | Shah | H04L 12/437 370/222 |
| 8,630,166 | B2* | 1/2014 | Kuwata | H04L 69/40 370/222 |
| 8,792,337 | B2* | 7/2014 | Higgins | H04L 12/437 370/222 |
| 8,804,490 | B2* | 8/2014 | Tatipamula et al. | 370/218 |
| 8,817,611 | B2* | 8/2014 | Kleineberg | H04L 12/40176 370/218 |
| 2003/0223377 | A1* | 12/2003 | Simmons et al. | 370/254 |
| 2004/0179471 | A1* | 9/2004 | Mekkittikul | H04L 12/437 370/218 |
| 2004/0223503 | A1* | 11/2004 | Lynch et al. | 370/404 |
| 2006/0182044 | A1* | 8/2006 | Maisch | H04L 12/42 370/258 |
| 2006/0245351 | A1* | 11/2006 | Pande | H04L 12/1868 370/216 |
| 2006/0294579 | A1* | 12/2006 | Khuti | H04L 63/02 726/3 |
| 2007/0143510 | A1* | 6/2007 | Schultze | H04L 12/422 710/100 |
| 2007/0280286 | A1* | 12/2007 | Hodson | H04L 67/12 370/466 |
| 2009/0161562 | A1* | 6/2009 | Shah | H04L 43/0811 370/245 |
| 2010/0074262 | A1* | 3/2010 | Breit | H04L 12/403 370/400 |
| 2010/0088442 | A1* | 4/2010 | Kuschke | 710/110 |
| 2010/0110904 | A1* | 5/2010 | Wimmer | 370/248 |
| 2010/0172245 | A1* | 7/2010 | Sridhar | H04L 12/437 370/242 |
| 2010/0177641 | A1* | 7/2010 | Farkas et al. | 370/242 |
| 2011/0205886 | A1* | 8/2011 | Maruyama | H04L 12/40176 370/225 |
| 2011/0261700 | A1* | 10/2011 | Maisch | H04L 12/40189 370/241 |
| 2011/0317555 | A1* | 12/2011 | Kleineberg et al. | 370/230 |
| 2012/0008530 | A1* | 1/2012 | Kulkarni | H04L 12/42 370/256 |
| 2012/0030310 | A1* | 2/2012 | Gotz | H04L 12/437 709/217 |
| 2012/0102240 | A1* | 4/2012 | Wei | H04L 12/403 710/30 |
| 2012/0260305 | A1* | 10/2012 | Gerlach | H04L 12/40006 726/1 |
| 2013/0208724 | A1* | 8/2013 | Colucci | H04L 12/40169 370/392 |

FOREIGN PATENT DOCUMENTS

| | | |
|---|---|---|
| EP | 2343857 A1 | 7/2011 |
| EP | 2362585 A1 | 8/2011 |
| WO | WO 2010105828 A1 | 9/2010 |

\* cited by examiner

REDUNDANTLY OPERABLE INDUSTRIAL COMMUNICATION SYSTEM, COMMUNICATION DEVICE AND METHOD FOR REDUNDANTLY OPERATING AN INDUSTRIAL COMMUNICATION SYSTEM

BACKGROUND OF THE INVENTION

1. Field of the Invention

In general, an industrial automation system comprises a multiplicity of automation devices that are networked to one another by an industrial communication network and is used within the context of production or process automation to control or regulate installations, machines or devices. On account of time-critical constraints in technical systems that are automated via industrial automation systems, real time communication protocols, such as Profinet, Profibus or Real-Time-Ethernet, are predominantly used in industrial communication networks for communication between automation devices.

2. Description of the Related Art

Interruptions in communication links between computer units in an industrial automation system or automation devices can result in undesirable or unnecessary repetition of transmission of a service request. This causes additional utilization of communication links in the industrial automation system, which can result in further system disturbances or errors. Furthermore, messages that are not transmitted or that are not transmitted completely can prevent an industrial automation system from changing to or remaining in a safe operating state, for example. This can finally result in failure of a complete production installation and costly production stoppage. A particular set of problems arises in industrial automation systems regularly as a result of report traffic with comparatively many but relatively short messages, as a result of which the above problems are amplified.

EP 2 343 857 A1 describes a network node for a communication network that comprises a first network portion and a second network portion connected to the latter. Whereas a spanning tree protocol is used in the first network portion, a second protocol that differs from the protocol of the first network portion is used in the second network portion. The network node is set up as an element for the second network portion and is designed for communication within the second network portion. Furthermore, the network node is designed and set up, via a spanning tree functionality, as a spanning tree main node for monitoring and controlling the second network portion. Hence, the second network portion can be treated as a virtual network node by the spanning tree protocol used in the first network portion by virtue of the network node undertaking a spanning tree protocol application as a spanning tree main node for other network nodes of the second network portion.

WO 2010/105828 A1 discloses a method for operating a communication network with redundancy properties that has a ring network topology. Within the communication network, communication devices are connected to one another by means of their data ports via data lines and interchange control data and useful data via the data lines based on communication protocols. In order to avoid continuous circling of messages in meshes of the communication network, the communication protocols are used to prevent transmission of messages via selected data ports on individual communication devices with the exception of messages for controlling and monitoring media redundancy. Within the communication network, two different communication protocols are applied in parallel with one another in the communication devices. By way of example, parallel application of the different communication protocols is achieved by assigning control over data ports that are to be blocked to a single communication protocol. Alternatively, parameters can be chosen for the communication protocols such that a first communication protocol does not block connections that are deemed active on the basis of a second communication protocol.

DE 10 2009 048 046 A1 discloses a method for connecting a network segment with a linear topology to a network portion with a ring topology, in which the network portion with the ring topology has a redundancy manager provided for it that monitors this network portion particularly for interruptions. The network segment with the linear topology has no redundancy manager provided for it, but rather two segment controllers at ends of the linear topology that control a connection to the network portion with the ring topology send control packets into the network segment with the linear topology. In this case, a first segment controller caters for data traffic linkage of the network segment with the linear topology to the network portion with the ring topology, while the second segment controller keeps its port that is provided for data traffic linkage to the network portion with the ring topology in a blocked state and receives only the control packets for the first segment controller. If the second segment controller recognizes an interruption in the network segment with the linear topology based on an absence of the control packets on the first segment controller, it switches its port that is provided for data traffic linkage to the network portion with the ring topology to a forwarding state. One disadvantage is that network nodes within the network segment with the linear topology cannot, following an interruption in a connection, independently reactivate their port that is associated with the interrupted connection, but rather have to wait for an instruction to do so from a segment controller. This slows down network reconfiguration following a connection failure.

U.S. Pat. No. 8,184,527 B2 also describes a method for network linkage of a ring portion to a closed ring in which a first and a second switch are provided for coupling the ring portion to the ring. In this case, a port of the first or second switch that is provided for data traffic linkage of the ring portion to the ring is blocked while a corresponding port of the respective other switch is activated. Here, the switch with the activated port sends data packets to the switch with the blocked port. When these test data packets are absent, the switch with the blocked port changes over the hitherto blocked port to a forwarding state. The ring portion has no redundancy manager provided for it in this case.

EP 1 575 221 A1 discloses a method for operating an Ethernet-based communication network that comprises a ring segment and a linear segment that is coupled to the linear segment at two coupling nodes. Both the ring segment and the linear segment have a respective dedicated redundancy manager provided for them. Furthermore, the two coupling nodes are in the form of a control network node and a corresponding partner network node and send one another test messages to detect interruptions in the linear segment. These test messages are intended not for the redundancy manager, however, but rather exclusively for the control network node and for the partner network node. Based on reception of these test messages, the control network node or the partner network node connects or disconnects a connection between the linear segment and the ring segment directly at the control network node or at the partner network node. The redundancy manager has dedicated test messages provided for it that are decoupled from the test messages interchanged between the control network node and the partner network node. The redundancy manager does not evaluate the test messages interchanged between the control network node and the partner network node.

SUMMARY OF THE INVENTION

It is an object of the present invention to provide a redundantly operable industrial communication system that allows redundant linkage of a linear topology to a ring or tree topology that can be easily configured and can be restored with short reconfiguration times, and also to provide a communication device that is suitable for this purpose and a method for redundantly operating such a communication system.

These and other objects and advantages are achieved in accordance with the invention by a communication device, a method and communication system, wherein the communication system comprises a plurality of communication devices that are redundantly linked to an industrial communication network within a ring or tree topology. The communication system also includes a plurality of communication devices that are interconnected within a linear topology. In this case, a first and a second communication device associated with the linear topology are linked to the industrial communication network within the ring or tree topology. A communication device that is configured as a ring portion redundancy manager within the linear topology comprises a monitoring and control unit that is configured to detect an interruption within the linear topology using transmitted test messages. By way of example, an absent test message indicates an interruption. Furthermore, the monitoring and control unit is configured to control forwarding of messages containing useful data between two ports, associated with the linear topology, of the communication device that is configured as a ring portion redundancy manager when an interruption is detected. The first and the second communication device within the linear topology are configured to return received test messages to the communication device that is configured as a ring portion redundancy manager or to send test messages to the communication device that is configured as a ring portion redundancy manager. This allows very extensive recourse to media redundancy mechanisms for easily and quickly reconfigurable redundant expansion of a ring or tree topology by a linear topology.

In accordance with a particularly preferred embodiment of the communication system in accordance with the invention, the communication devices interconnected within the linear topology are configured to automatically ascertain the communication device that is configured as a ring portion redundancy manager using a comparison of device identifiers or priorities associated with these communication devices. This allows further shortening of reconfiguration times, such as after connection failures. Furthermore, the communication devices interconnected within the linear topology are preferably configured to independently change the state of a port that is blocked after an interruption to a state that forwards useful data, specifically regardless of intervention by a communication device that is configured as a ring portion redundancy manager. This allows the ring portion redundancy manager to be relieved of a load and allows simplified, faster reconfiguration, such as after network errors.

In accordance with an embodiment of the communication system in accordance with the invention, the first or second communication device within the linear topology may be configured as a ring portion redundancy manager. Alternatively, it is also possible for a third communication device within the linear topology to be configured as a ring portion redundancy manager. This allows flexible configuration of a redundantly operable industrial communications system in line with requirements.

Preferably, the communication devices that are interconnected within the linear topology or the communication devices that are interconnected within the ring topology are configured for message transmission based on the media redundancy protocol. According to a further advantageous embodiment of the communication system in accordance with the invention, the first and second communication devices that are associated with the linear topology are linked to the industrial communication network within a ring topology. In this case, the communication devices that are redundantly linked to the industrial communication network within the ring topology each comprise a first and a second port for connection to the ring topology and also a coupling element that interconnects the first and second ports. Furthermore, a communication device that is configured as a ring redundancy manager within the ring topology comprises a monitoring and control unit. In this case, the monitoring and control unit is configured to detect an interruption within the ring topology using transmitted test messages and to control forwarding of messages containing useful data between the first and second ports when an interruption is detected. This allows simple expansion of an industrial communication network with a ring topology by a ring portion.

In accordance with an alternative embodiment of the communication system in accordance with the invention, the first and second communication devices that are associated with the linear topology are linked to the industrial communication network within a tree topology. In this case, the communication devices that are interconnected within the tree topology are configured for message transmission based on a spanning tree protocol. This allows simple expansion of an industrial communication network with a tree topology by a ring portion.

It is also an object of the invention to provide a communication device for a redundantly operable industrial communication system, where the communication device comprises a plurality of ports for connection to communication devices that are interconnected within a ring or tree topology and to communication devices that are interconnected within a linear topology. In addition, a coupling element that connects the ports to one another is provided. Furthermore, the communication device in accordance with the invention is configured to return received test messages to a communication device that is configured as a ring portion redundancy manager within the linear topology or to send test messages to the communication device that is configured as a ring portion redundancy manager.

It is also an object of the invention to provide a method for redundantly operating an industrial communication system, in which a plurality of communication devices that are redundantly linked to an industrial communication network within a ring or tree topology are provided. In addition, a plurality of communication devices that are interconnected within a linear topology are provided, from which communication devices a first and a second communication device are linked to the industrial communication network within the ring or tree topology. The communication devices that are interconnected within the linear topology and the communication devices that are interconnected within the ring topology transmit messages preferably based on the media redundancy protocol.

A communication device that is configured as a ring portion redundancy manager within the linear topology comprises a monitoring and control unit that, based on the method in accordance with the invention, detects an interruption within the linear topology using sent test messages. By way of example, an absent test message indicates an interruption. Furthermore, the monitoring and control unit controls forwarding of messages containing useful data between two ports, associated with the linear topology, of the communication device that is configured as a ring portion redundancy manager when an interruption is detected. The first and the second communication devices return test messages received within the linear topology to the communication device that is configured as a ring portion redundancy manager or send test messages to the communication device that is configured as a ring portion redundancy manager. This allows easily and quickly reconfigurable redundant expansion of a ring or tree topology by a linear topology.

In accordance with one particularly preferred embodiment of the method in accordance with the invention, the communication devices that are interconnected within the linear topology automatically ascertain the communication device that is configured as a ring portion redundancy manager using a comparison of device identifiers or priorities associated with these communication devices. Furthermore, the communication devices that are interconnected within the linear topology preferably independently initiate a change of state for a port that is blocked following an interruption to a state that forwards useful data. Overall, these developments allow simplified and fast network reconfiguration.

The first and second communication devices that are associated with the linear topology may be linked to the industrial communication network within a ring topology, for example. In this case, the communication devices that are redundantly linked to the industrial communication network within the ring topology each comprise a first and a second port for connection to the ring topology and also a coupling element that interconnects the first and second ports to one another. In addition, a communication device that is configured as a ring redundancy manager within the ring topology comprises a monitoring and control unit that detects an interruption within the ring topology using sent test messages. Furthermore, the monitoring and control unit controls forwarding of messages containing useful data between the first and second ports when an interruption is detected. In accordance with an alternative embodiment of the method in accordance with the invention, the first and second communication devices that are associated with the linear topology may be linked to the industrial communication network within a tree topology. Here the communication devices that are interconnected within the tree topology transmit messages based on a spanning tree protocol. Overall, a ring or tree topology can be expanded by a linear topology in an easily and quickly reconfigurable fashion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using exemplary embodiments with reference to the drawing, in which.

DETAILED DESCRIPTION OF THE PREFERRED EMBODIMENTS

Figure 1:
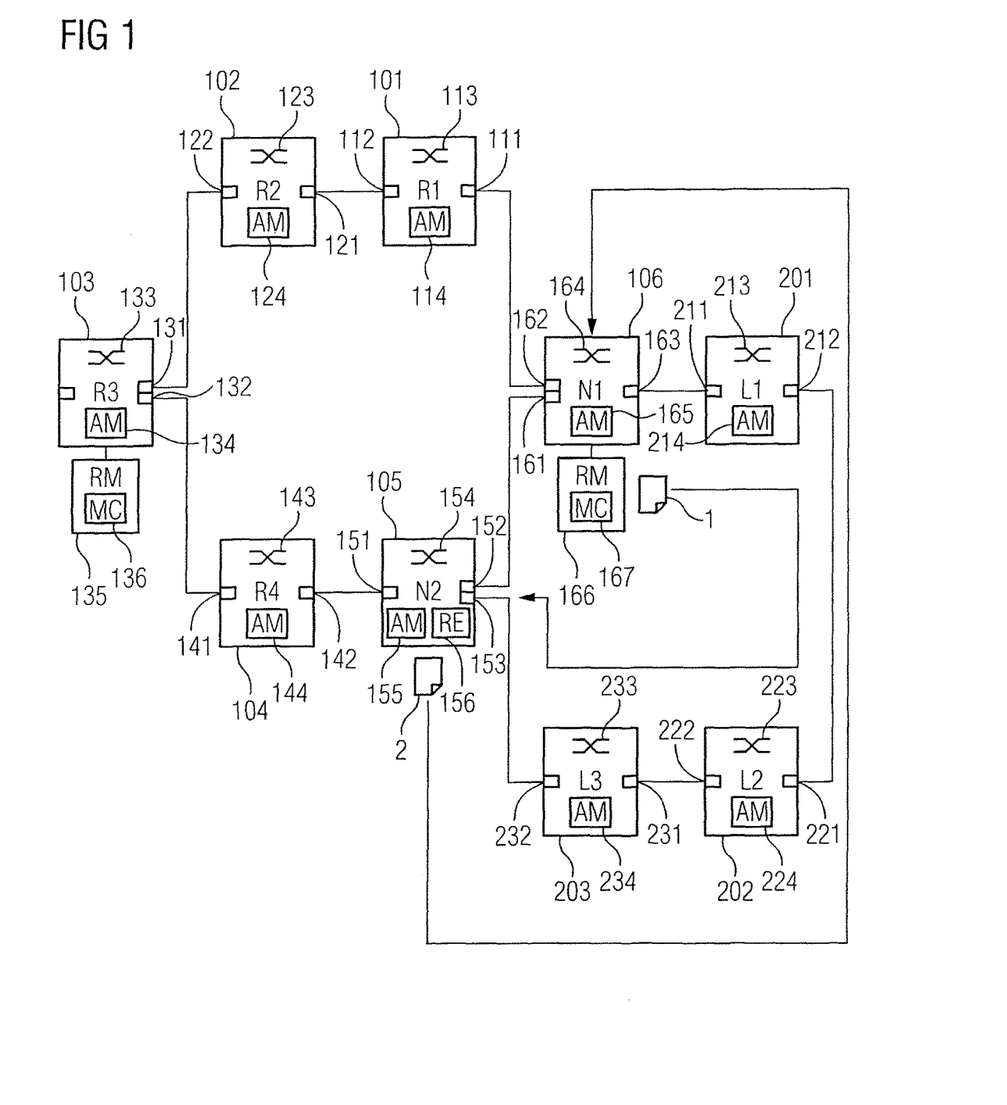
FIG. 1 shows an industrial communication system that comprises a first network portion with a ring topology and a second network portion with a linear topology that is connected to the second network portion.

The redundantly operable industrial communication system shown in FIG. 1 comprises a first network portion with a plurality of communication devices 101-106 that are connected to one another within a ring topology. The communication devices 101-106 that are connected to one another within the ring topology each comprise at least a first and a second port 111-112, 121-122, 131-132, 141-142, 151-152, 161-162 for connecting the respective communication device to the ring topology. Furthermore, these communication devices 101-106 each have a coupling element 113, 123, 133, 143, 154, 164 that connects their ports to one another. From the communication devices 101-106, a communication device 103 is configured as a ring redundancy manager within the ring topology and comprises a redundancy manager functional unit 135 with a monitoring and control unit 136. This monitoring and control unit 136 detects an interruption within the ring topology using transmitted test messages and controls forwarding of messages containing useful data between the first and second ports 131-132 of the communication device 103 that is configured as a ring redundancy manager when an interruption is detected. In an undisturbed operating state, one of the two ports 131-132 of the communication device 103 that is configured as a ring redundancy manager is in a blocked state with respect to forwarding messages containing useful data, as a result of which only test messages are forwarded, for example. When an interruption within the ring topology is detected, which is indicated preferably by an absence of test messages, the monitoring and control unit 136 prompts the previously blocked port 131 or 132 to change to a state that forwards messages containing useful data.

Furthermore, the industrial communication system shown in FIG. 1 comprises a second network portion with a plurality of communication devices 201-203, 105-106 that are connected to one another within a linear topology. From these communication devices 201-203, 105-106, a first and a second communication device 105-106 are incorporated in the first network portion within the ring topology. The communication devices 201-203, 105-106 that are interconnected within the linear topology each comprise at least a first and a second port 211-212, 221-222, 231-232, 151-153, 161-163 for connecting the respective communication device to the linear topology. In the case of the communication devices 105-106, a respective port 153, 163 is provided for controllable linkage of the second network portion to the first network portion. Furthermore, the communication devices 201-203, 105-106 that are associated with the second network portion each have a coupling element 213, 223, 233, 154, 164 that connects their ports to one another.

In the second network portion, a communication device 106 is configured as a ring portion redundancy manager within the linear topology and comprises a redundancy manager functional unit 166 with a monitoring and control unit 167. In accordance with the exemplary embodiment shown in FIG. 1, the second communication device 106, which links the second network portion to the first network portion, is configured as a redundancy manager within the linear topology. The first communication device 105, which links the second network portion to the first network portion, comprises a reflector unit 156, corresponding to the monitoring and control unit 167, for test messages for detecting an interruption within the linear topology. In principle, the first communication device 105 can also be configured as a redundancy manager within the linear topology. In this case, the second communication device 106 would have a reflector unit instead of the redundancy manager functional unit 166 with the monitoring and control unit 167.

Figure 2:
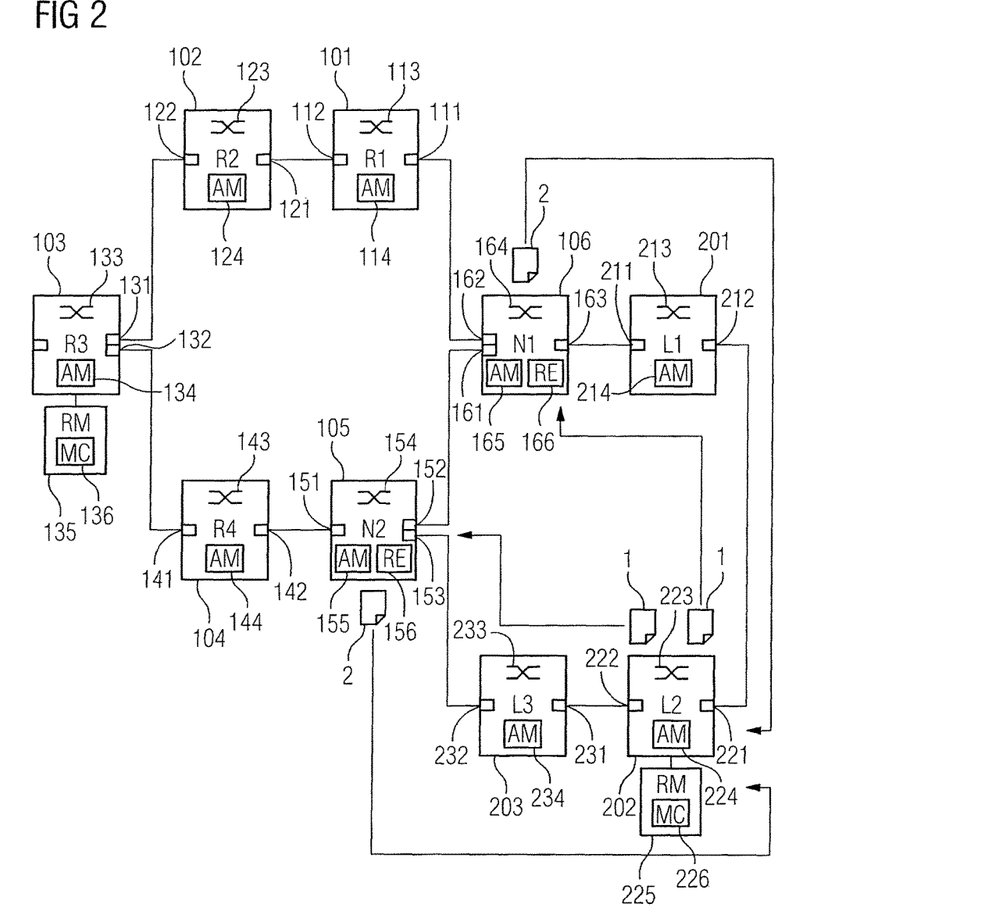
FIG. 2 shows the industrial communication system of FIG. 1 with an altered configuration for the second network portion.

In accordance with the exemplary embodiment shown in FIG. 2, a third communication device 202 within the linear topology is configured as a ring portion redundancy manager and comprises a redundancy manager functional unit 225 with a monitoring and control unit 226. Here, both the first communication device 105 and the second communication device 106 comprise a reflector unit 156, 166' that corresponds to the monitoring and control unit 226 of the ring portion redundancy manager. The communication devices 201-203, 105-106 that are interconnected within the linear topology ascertain the communication device that is configured as a ring portion redundancy manager automatically using a comparison of device identifiers or priorities associated with these communication devices. To this end, the communication devices 201-203, 105-106 that are interconnected within the linear topology each have an automanager functional unit 214, 224, 234, 155, 165. The automanager functional units 214, 224, 234, 155, 165 align the device identifiers or priorities and also select the communication device that has the device identifier with the lowest associated address value or the highest priority, for example, as ring portion redundancy manager. Preferably, the communication devices 101-106 associated with the first network portion also each comprise an automanager functional unit 114, 124, 134, 144, 155, 165 for selecting the ring redundancy manager.

The monitoring and control unit 167, 226 of the respective ring portion redundancy manager detects an interruption within the linear topology preferably using sent test messages 1 and controls forwarding of messages containing useful data between two ports, associated with the linear topology, of the communication device 106, 202 that is configured as a ring portion redundancy manager when an interruption is detected. An absent test message 1 indicates an interruption, for example. Depending on the configuration of the ring portion redundancy manager, the first or the second communication device 105, 106, which link the second network portion to the first network portion, return test messages 1 received within the linear topology to the respective communication device 106, 202 that is configured as a ring portion redundancy manager as response messages 2 using the reflector unit 156, 166'. Alternatively, the first and second communication devices 105, 106 can send their own test messages periodically to the communication device 106, 202 that is configured as a ring portion redundancy manager.

In the present exemplary embodiment, the communication devices 201-203, 105-106 that are interconnected within the linear topology and the communication devices 101-106 that are connected to one another within the ring topology transmit messages based on the media redundancy protocol (MRP). Preferably, the communication devices 201-203, 105-106 that are interconnected within the linear topology independently initiate a change of state for a port that is blocked following an interruption to a state that forwards useful data. Advantageously, the communication devices 201-203 that are interconnected within the linear topology can be implemented by means of customary MRP clients. Changes are required only for the first and second communication devices 105, 106 that link the second network portion to the first network portion, specifically with respect to the reflector unit 156, 166'. If the first or second communication device 105, 106 is configured as a ring portion redundancy manager, then respective redundancy manager functional unit initially deactivates a link from the second network portion to the first network portion upon startup. Connection to the line. This corresponds to customary MRP behavior. If no test messages are received, then the port on the first or second communication device 105-106 that is provided for linking the second network portion is activated in order to transmit useful data.

Figure 3:
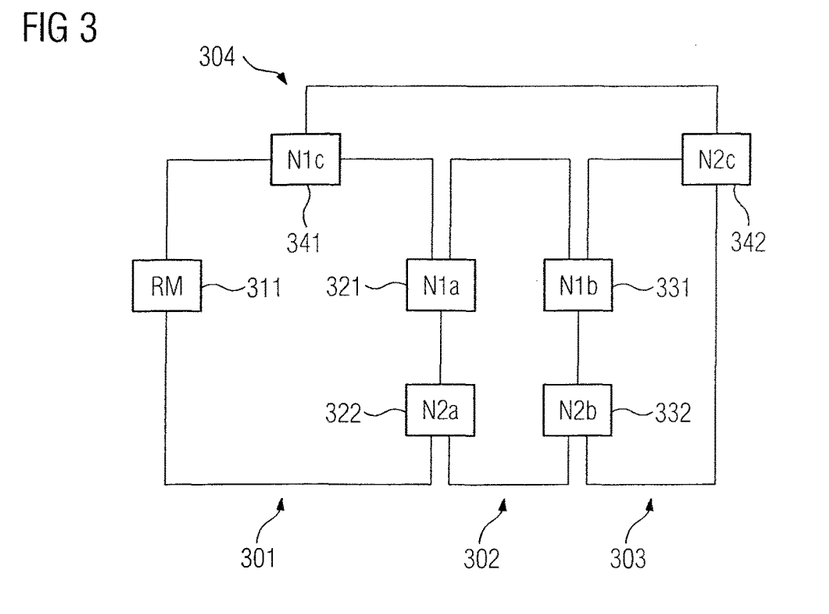
FIG. 3 shows a schematic illustration of an industrial communication system that comprises a network portion with a ring topology and three network portions with a linear topology that are connected to the three network portions.

By analogy with the explanations above, an industrial communication system that comprises a first network portion 301 with a ring topology and ring redundancy manager 311 can be expanded by further network portions 302-304 with a linear topology. In accordance with the exemplary embodiment shown in FIG. 3, the first network portion 301 has a second network portion 302 with a linear topology linked thereto. To this end, a first coupling network node 321 between the first and second network portions 301, 302 has a communication device provided on it that is configured as a ring portion redundancy manager, while a second coupling network node 322 has a communication device with a reflector unit provided thereon. The second network portion 302 in turn has a third network portion 303 with a linear topology linked thereto. To this end, a first coupling network node 331 between the second and third network portions 302, 303 has a communication device provided thereon that configured as a ring portion redundancy manager, while a second coupling network node 332 has a communication device with a reflector unit provided thereon. Furthermore, a fourth network portion 304 with a linear topology has one line end linked to the first network portion 301 and another line end linked to the third network portion 303. Here, a first coupling network node 341 between the first and fourth network portions 301, 304 has a communication device provided thereon that is configured as a ring portion redundancy manager, while a second coupling network node 342 between the third and fourth network portions 303, 304 has a communication device with a reflector unit provided thereon.

Figure 4:
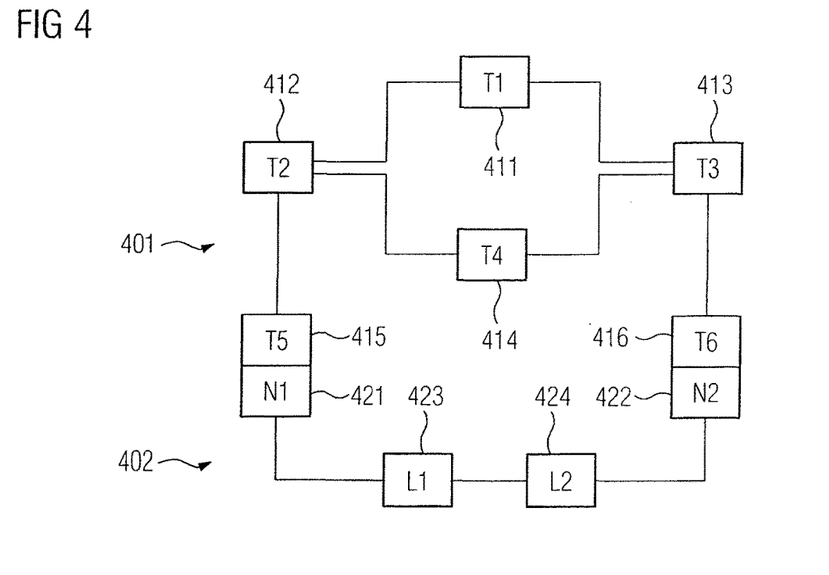
FIG. 4 shows a schematic illustration of an industrial communication system that comprises a network portion with a tree topology and a network portion with a linear topology that is connected to the network portion.

In accordance with the exemplary embodiment shown in FIG. 4, it is also possible for an industrial communication system that comprises a first network portion 401 with a tree topology to be expanded by a second network portion 402 or a plurality of network portions with a linear topology. Here, the communication devices 411-416 that are interconnected within the tree topology transmit messages based on a spanning tree protocol. The second network portion 402 comprises a communication device 421 that is configured as a ring portion redundancy manager on a first coupling network node for the first network portion 401. A second coupling network node between the first and second network portions 401, 402 has a communication device 422 with a reflector unit provided thereon. Between the first and second coupling network nodes, two further communication devices 423, 424 that comprise customary MRP clients are connected within the linear topology of the second network portion 402.

The features of the exemplary embodiments described above can be implemented either individually or in the described combination with one another.

Figure 5:
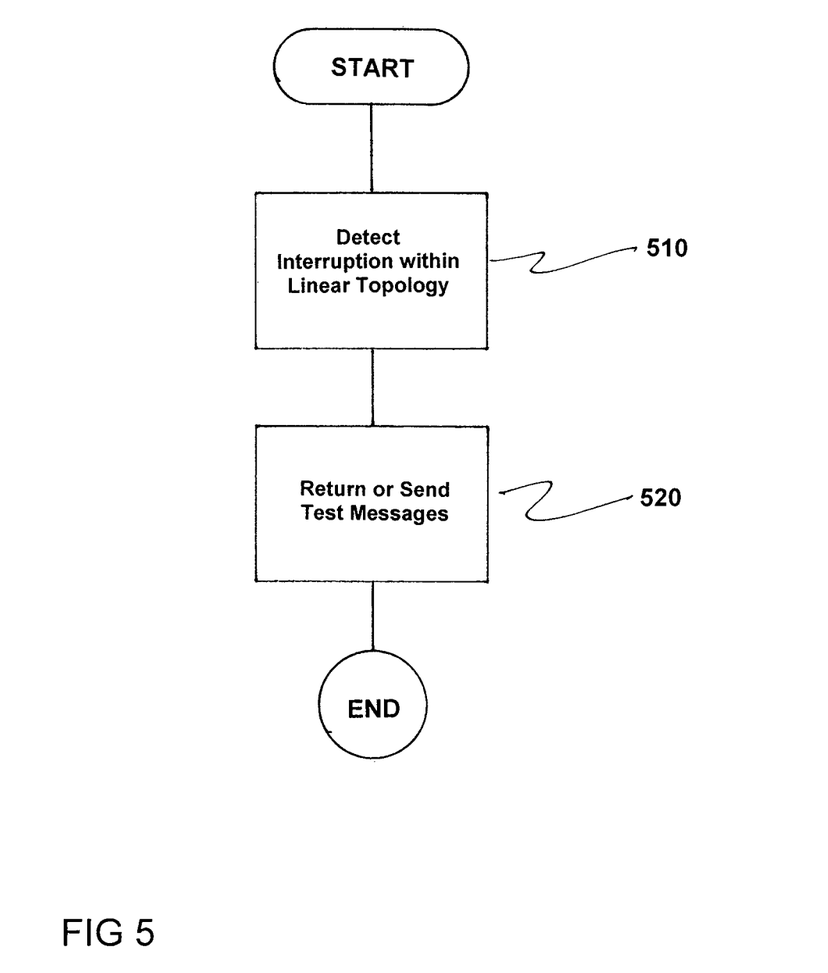
FIG. 5 is a flowchart of the method in accordance with the invention.

FIG. 5 is a flowchart of a method for redundantly operating an industrial communication system including a plurality of communication devices redundantly linked to an industrial communication network within one of a ring and tree topology, and a plurality of communication devices interconnected within a linear topology, where a first and a second communication device of the plurality of communication devices interconnected within the linear topology is linked to the industrial communication network within one of the ring and tree topology.

The method comprises detecting, by a monitoring and control unit of a communication device configured as a ring portion redundancy manager within the linear topology, an interruption within the linear topology using sent test messages and controlling by a monitoring and control unit forwarding of messages containing useful data between a plurality of ports, associated with the linear topology, of the communication device configured as the ring portion redundancy manager when an interruption is detected, as indicated in step 410.

Next, the first and/or second communication devices return test messages received within the linear topology to the communication device configured as the ring portion redundancy manager or send test messages to the communication device that configured as the ring portion redundancy manager, as indicated in step 420.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A redundantly operable industrial communication system comprising:

a first network portion including a first plurality of communication devices redundantly linked to an industrial communication network within one of a ring and tree topology, said first and second plurality of communication devices and the industrial communication network communicating based on one of Profinet protocol and Profibus protocol;

a second network portion including a second plurality of communication devices interconnected within a linear topology, a first and a second communication device of the second plurality of communication devices being linked to the industrial communication network within one of the ring or tree topology;

wherein the second communication device of the second plurality of communication devices included in the second network portion is configured as a ring portion redundancy manager within the linear topology and comprises a monitor/controller which detects an interruption within the linear topology using transmitted test messages and controls forwarding of messages containing data between a plurality of ports, associated with the linear topology, of the second communication device configured as the ring portion redundancy manager when an interruption is detected; and     wherein at least one of the first and the second communication device of the second plurality of communication devices interconnected within the linear topology is configured to return received test messages to the communication device that is set up as a ring portion redundancy manager or to send test messages to the communication device configured as the ring portion redundancy manager.

2. The communication system as claimed in claim 1, wherein each of the second plurality of communication devices interconnected within the linear topology is configured to automatically ascertain the second communication device that is configured as the ring portion redundancy manager using a comparison of at least one of device identifiers and device priorities associated with the second plurality of communication devices interconnected within the linear topology.

3. The communication system as claimed in claim 1, wherein each of the second plurality of communication devices interconnected within the linear topology is configured to independently change a state of a port of the plurality of ports that is blocked following an interruption to a state that forwards data.

4. The communication system as claimed in claim 2, wherein each of the second plurality of communication devices interconnected within the linear topology is configured to independently change a state of a port of the plurality of ports that is blocked following an interruption to a state that forwards data.

5. The communication system as claimed in claim 1, further comprising a third communication device interconnected within the linear topology and configured as the ring portion redundancy manager.

6. The communication system as claimed in claim 1, wherein at least one of (i) each of the second plurality of communication devices interconnected within the linear topology and (ii) each of the first plurality of communication devices interconnected within the ring topology is configured to transmit the messages based on a media redundancy protocol.

7. The communication system as claimed in claim 1, wherein an absent test message indicates an interruption.

8. The communication system as claimed in claim 1, wherein the first and second communication devices of the second plurality of communication devices interconnected within the linear topology redundantly linked to the industrial communication network within the ring topology each comprise a first and a second port for connection to the ring topology and a coupler which interconnects first and second ports of the plurality of ports; and wherein the second communication device configured as the ring redundancy manager within the ring topology and comprising the monitor/controller detects the interruption within the ring topology using transmitted test messages and controls forwarding of messages containing data between the first and second ports when the interruption is detected.

9. The communication system as claimed in claim 1, wherein the first and second communication device of the second plurality of devices associated interconnected within the linear topology are linked to the industrial communication network within the tree topology; and wherein first communication devices that are interconnected within the tree topology are configured to transmit messages based on a spanning tree protocol.

10. A communication device for a redundantly operable industrial communication system, comprising:

a plurality of ports for connection to first communication devices of a first network portion interconnected within one of a ring and tree topology and to second communication devices in a second network portion interconnected within a linear topology, said communication devices and the industrial communication network communicating based on one of Profinet protocol and Profibus protocol;

a coupler for interconnecting the plurality of ports;

wherein a second communication device of the second communication devices included in the second network portion interconnected within the linear topology one of (i) returns received test messages to a communication device comprising a ring portion redundancy manager within the linear topology and (ii) sends the test messages to the communication device comprising the ring portion redundancy manager.

11. A method for redundantly operating an industrial communication system including a first network portion including a first plurality of communication devices redundantly linked to an industrial communication network within one of a ring and tree topology, and including a second network portion including a second plurality of communication devices interconnected within a linear topology, a first and a second communication device of the second plurality of communication devices interconnected within the linear topology being linked to the industrial communication network within one of the ring and tree topology, the method comprising:

detecting, by a monitor/controller of the second communication device comprising a ring portion redundancy manager within the linear topology, an interruption within the linear topology using sent test messages and controlling by the monitor/controller forwarding of messages containing data between a plurality of ports, associated with the linear topology, of the second communication device comprising the ring portion redundancy manager when an interruption is detected; and returning, by at least one of the first and second communication devices of the second plurality of communication devices interconnected within the linear topology, test messages received within the linear topology to the communication device comprising the ring portion redundancy manager or sending test messages to the communication device the ring portion redundancy manager, wherein said first and second plurality of communication devices and the industrial communication network communicate based on one of Profinet protocol and Profibus protocol.

12. The method as claimed in claim 11, wherein each of the second plurality of communication devices interconnected within the linear topology ascertains the second communication device which comprises the ring portion redundancy manager automatically using a comparison of at least one of device identifiers and priorities associated with the second plurality of communication devices.

13. The method as claimed in claim 11, wherein each of the second plurality of communication devices interconnected within the linear topology independently initiates a change of state of a port of the plurality of ports which is blocked following the interruption to a state that forwards data.

14. The method as claimed in claim 12, wherein each of the second plurality of communication devices interconnected within the linear topology independently initiates a change of state of a port of the plurality of ports which is blocked following the interruption to a state that forwards data.

15. The method as claimed in claim 11, wherein at least one of (i) each of the second plurality of communication devices interconnected within the linear topology and (ii) the communication devices interconnected within the ring topology transmits messages based on a media redundancy protocol.

16. The method as claimed in claim 11, wherein an absent test message indicates an interruption.

17. The method as claimed in claim 11, wherein the first and second communication devices associated with the linear topology linked to the industrial communication network within the ring topology each comprise a first and a second port for connection to the ring topology and a coupling element interconnecting the first and second ports; and wherein the second communication device configured as the ring redundancy manager within the ring topology comprising the monitor/controller detects the interruption within the ring topology using sent test messages and controls forwarding of messages containing data between the first and second ports when the interruption is detected.

18. The method as claimed in claim 11, wherein the first and second communication devices associated with the linear topology are linked to the industrial communication network within the tree topology; and wherein the first communication devices that are interconnected within the tree topology transmit messages based on a spanning tree protocol.

* * * * *